United States Patent
Brandstetter et al.

(10) Patent No.: US 12,043,718 B2
(45) Date of Patent: Jul. 23, 2024

(54) PROCESS FOR PRODUCING POLY(METH)ACRYLIMIDE MATERIALS

(71) Applicant: Mubea Carbo Tech GmbH, Salzburg (AT)

(72) Inventors: Dominik Brandstetter, Salzburg (AT); Thomas Schrofner, Puch bei Hallein (AT); Marc Linus Fecher, Laufen (DE); Christina Theobald, Hallein (AT)

(73) Assignee: Mubea Carbo Tech GmbH, Salzburg (AT)

( * ) Notice: Subject to any disclaimer, the term of this patent is extended or adjusted under 35 U.S.C. 154(b) by 467 days.

(21) Appl. No.: 17/287,172

(22) PCT Filed: Nov. 19, 2019

(86) PCT No.: PCT/EP2019/081746
§ 371 (c)(1),
(2) Date: Apr. 21, 2021

(87) PCT Pub. No.: WO2020/109072
PCT Pub. Date: Jun. 4, 2020

(65) Prior Publication Data
US 2021/0380776 A1    Dec. 9, 2021

(30) Foreign Application Priority Data
Nov. 26, 2018 (CH) .................... 01456/18

(51) Int. Cl.
*C08J 9/18* (2006.01)
*C08J 9/232* (2006.01)

(52) U.S. Cl.
CPC ............... *C08J 9/18* (2013.01); *C08J 9/232* (2013.01); *C08J 2205/10* (2013.01); *C08J 2333/26* (2013.01)

(58) Field of Classification Search
CPC . C08J 9/18; C08J 9/232; C08J 2205/10; C08J 2333/26; C08J 9/22; C08J 9/16
See application file for complete search history.

(56) References Cited

U.S. PATENT DOCUMENTS

| | | | |
|---|---|---|---|
| 3,627,711 A † | 12/1971 | Schroeder et al. | |
| 3,734,870 A | 5/1973 | Schroeder et al. | |
| 4,331,783 A | 5/1982 | Stoy | |
| 6,117,495 A | 9/2000 | Hanson et al. | |
| 2008/0230956 A1 | 9/2008 | Allmendinger et al. | |
| 2014/0134422 A1* | 5/2014 | Kraatz | B32B 5/20 264/46.4 |
| 2014/0309361 A1 † | 10/2014 | Buehler et al. | |
| 2016/0332344 A1 † | 11/2016 | Bernhard et al. | |
| 2017/0087750 A1 † | 3/2017 | Bernhard et al. | |
| 2017/0136665 A1 † | 5/2017 | Bernhard et al. | |
| 2018/0311869 A1 † | 11/2018 | Kraatz et al. | |

FOREIGN PATENT DOCUMENTS

| | | |
|---|---|---|
| CN | 101857656 A | 10/2010 |
| CN | 103524661 A | 1/2014 |
| DE | 102005026730 † | 12/2006 |
| EP | 0094977 A1 | 11/1983 |
| EP | 0736645 A2 * | 10/1996 |
| EP | 2956499 A1 | 12/2015 |
| GB | 1301750 A | 1/1973 |
| WO | 2017067867 † | 4/2017 |

OTHER PUBLICATIONS

International Search Report mailed Feb. 4, 2020 for PCT/EP2019/081746.
Gaenzler W et al: "Die Pol Ymeranaloge Bildung Von Imidgruppen in Metharcrylsaeure/ Methacrylnitril-Copolymeren", Ang Ewan Dte Makromolekulare Chemie. Applied Macromolecularchemistry and Physics, Wiley VCH, Weinheim, DE, vol. 119, Jan. 1, 1970 (Jan. 1, 1970), pp. 91-108, XP001135239, ISSN: 0003-3146, DOI: 10.1002/APMC.1970.050110109.
Office Action for EP19806194.7 mailed Mar. 21, 2023.
Chinese Patent Application No. 201980074814.0, Office Action Issued Jul. 20, 2022.
Office Action for EP19806194.7 mailed Jun. 17, 2022.
Ganzler et al., Die polymeranaloge Bildung von Imidgruppen in Methacrylsaure/Methacrylnitril-Copolymeren Die Angewandte Makromolekulare Chemie, 11(1970) (Nr. 119), p. 91 summary, p. 93 first full paragraph, p. 94 last full paragraph, p. 96 first paragraph, p. 104 first paragraph, and p. 105 second paragraph.†

* cited by examiner
† cited by third party

*Primary Examiner* — K. Boyle
(74) *Attorney, Agent, or Firm* — GrowIP Law Group LLC

(57) ABSTRACT

Disclosed herein is a process for the production of poly (meth)acrylimide materials. Therein, a granulated copolymer of (meth)acrylic acid and (meth)acrylonitrile is prefoamed and imidated by thermal treatment in a single step to provide poly(meth)acrylimide particles.

16 Claims, No Drawings

PROCESS FOR PRODUCING POLY(METH)ACRYLIMIDE MATERIALS

CROSS-REFERENCE TO RELATED APPLICATIONS

This application claims the benefit of the filing date of international PCT Application No. PCT/EP2019/081746, filed on Nov. 19, 2019, that in turn claims priority to Swiss Patent Application No. CH01456/18, filed on Nov. 26, 2018, the contents of which are hereby incorporated by reference in their entirety.

TECHNICAL FIELD

The disclosure relates to the field of foam-molded rigid hard materials, in particular a process for the production of poly(meth)acrylimide materials.

BACKGROUND

Poly(meth)acrylimide (PMI), is a polyimide serving as a precursor for the production of poly(meth)acrylimide rigid foams. Due to their high stability paired with their low overall weight, these foams became especially prominent in aircraft and car construction as well as related technologies.

Typically, poly(meth)acrylimide is either made from poly(meth)acrylate and a suitable amine, such as methylamine, or by thermal treatment of a (meth)acrylate and (meth)acrylonitrile copolymer. In any case, a PMI polymer block is subsequently grinded to provide a PMI granulate which is then foam-molded to produce the desired PMI rigid foams. In certain procedures, the PMI granulate is prefoamed before the foam-molding. Thereafter, the thus obtained PMI materials or PMI cores are usually processed in a pressing tool to provide the desired composite parts.

SUMMARY

The production methods of PMI materials known in the state of the art suffer from various drawbacks. In order to avoid handling volatile and hazardous low molecular weight amines, the method of choice for producing poly(meth)acrylimide polymer or polymer blocks, is the copolymerization of (meth)acrylate and (meth)acrylonitrile and subsequent thermal treatment to cyclize the nitrile- and carboxy-functionalities under formation of the corresponding imides. Currently, this process is performed as a two-step procedure. That is, in a first step, the copolymer is generated and in a second step, the solid polymer block undergoes thermal treatment. The thermal treatment of the respective copolymer block is often cumbersome and requires special apparatuses. For example, the copolymer block is sandwiched between two special glass plates, which have to be sealed at their sides. The temperature is then provided by a water bath surrounding the sealed plates. Typically, it is rather difficult to achieve a uniform heat distribution within the copolymer. As a consequence, this process is not only more expensive as it requires a special imidation apparatus, but also because the imidation process itself is slow due to the non-uniform heat distribution within the polymer block.

Furthermore, for generating the PMI foams, at least four process steps are necessary, which all require different tools and apparatuses: (1) Copolymer formation, (2) Imidation, (3) Grinding and (4) Foam-molding.

Another drawback of currently employed technologies is that foam molding of PMI particles is rather difficult. In particular, parts comprising a complex geometry, such as small edges, channels, grooves, etc. often brake when the foam-molded PMI material is removed from the forming tool. Additionally, the surface of the obtained PMI foam materials is often structured or contains pores which has been found to exhibit deleterious effects on the surface quality of any corresponding composite materials.

Consequently, despite its beneficial properties, PMI foams are still not as prominently used as other rigid foams, such as polyvinylchloride or polyurethane. Reasons for this are, amongst others, the high costs and the difficulties associated with their production.

It is therefore an overall object of the present disclosure to improve the state of the art regarding processes for the production of poly(meth)acrylimide materials, thereby preferably avoiding disadvantages of the prior art fully or partly.

In favorable embodiments, a cost efficient process for producing PMI materials is provided. In further favorable embodiments, the process reduces or minimizes the number of steps necessary to produce PMI materials, PMI form molded components and/or PMI foams.

In additional favorable embodiments, the process for producing PMI materials yields PMI foams or PMI foam-molded components, with an at least reduced number of pores, or at least pores with reduced pore sizes or with an essentially even surface.

The overall objective is in a general way achieved by the subject-matter of the independent claim. Further advantageous and exemplary embodiments follow from the dependent claims and the description.

According to a first aspect, the overall objective is achieved by a process for the production of poly(meth)acrylimide materials, wherein a granulated copolymer of (meth)acrylic acid and (meth)acrylonitrile is prefoamed and imidated by thermal treatment in a single step to provide poly(meth)acrylimide particles. It has been surprisingly found that if a granulated copolymer of (meth)acrylic acid and (meth)acrylonitrile is employed, prefoaming and imidation can be performed efficiently in a single process step. In particular, the fact that a granulated copolymer of (meth)acrylic acid and (meth)acrylonitrile is used significantly reduces the reaction time required for the imidation. This represents a significant advantage over the currently employed methods, which usually require thermal treatment of several hours up to several days. Furthermore, the process according to the disclosure reduces the number of process steps to generate PMI materials, prefoamed PMI particles or PMI molded foam components, as the imidation and the prefoaming can be concomitantly performed in a single step. Prefoaming and imidation may for example be performed in a pre-foaming unit.

It is understood herein that the term (meth)acrylic acid includes methacrylic acid, acrylic acid, or mixtures thereof. The term (meth)acrylonitrile includes acrylonitrile, methacrylonitrile and mixtures thereof. The term poly(meth)acrylimide or the abbreviation PMI include both polyacrylimides and polymethacrylimides. In particular, these also include polymethacrylimides or polyacrylimides obtained from methacrylonitrile, acrylonitrile, methacrylic acid or acrylic acid, suitable derivatives thereof or mixtures therefrom.

Furthermore, it is clear to the skilled person that the terms "imidated" or "imidation" refer to imide formation. In the context of polymers, in particular in context of poly(meth)acrylimide, the skilled person understands that an imidation does not necessarily require that all nitrile and/or carboxy-functionalities within the polymer react to produce an imide.

Preferably, in all embodiments described herein, a granulated copolymer of (meth)acrylic acid and acrylonitrile may be employed, more preferably a copolymer of methacrylic acid and acrylonitrile.

In a preferred embodiment, the process for production of poly(meth)acrylimide materials comprises a preceding step, wherein the granulated copolymer of (meth)acrylic acid and (meth)acrylonitrile is provided by grinding a copolymer block of (meth)acrylic acid and (meth)acrylonitrile.

Typically, the grinding provides a granulate with a particle size of 0.2 to 4 mm, preferably 0.5 to 3 mm.

In another embodiment, the thermal treatment is performed for 2 to 15 min, preferably 3 to 7 min. The skilled person understands that the thermal treatment requires thermal energy in a range which is suitable for prefoaming and imidation. Furthermore, it is clear to the skilled person that the required thermal energy is dependent on parameters such as particle size, degree of prefoaming, desired density, nature of the propellant, etc.

In a further embodiment, a core temperature of 170 to 250° C. of the granulated copolymer of (meth)acrylic acid and (meth)acrylonitrile and/or the formed poly(meth)acrylate particles is reached during the thermal treatment.

Preferably, the granulated copolymer of (meth)acrylic acid and (meth)acrylonitrile is provided as a single layer during thermal treatment. Thereby, the heat can be uniformly distributed and uniform prefoaming is achieved.

In a preferred embodiment, the thermal treatment is performed by an infrared source or by an oven. Using an infrared source has the advantage that significantly high penetration depths can be achieved. Furthermore, it has been surprisingly found that it is at all possible to concomitantly prefoam and imidate a granulated copolymer of (meth)acrylic acid and (meth)acrylonitrile. Thereby, IR radiation proved advantageous, as it allows the energy applied to the granulated copolymer to be specifically defined.

Typically, the infrared source emits infrared radiation with wavelengths in the range of 1 to 10 μm. This range has been found to provide sufficient energy to allow prefoaming and imidation in a rapid and efficient way.

Alternatively, an oven, preferably a drying oven, may be used for performing the thermal treatment. It is for example possible to fill the oven with the granulated copolymer of (meth)acrylic acid and (meth)acrylonitrile and expose the granulated copolymer to a stream of hot air. In particular, it may be possible to conduct a predefined time/temperature program.

In another embodiment, the granulated copolymer of (meth)acrylic acid and (meth)acrylonitrile comprises a propellant. Typical propellants include for example low molecular alkanes such as pentane or hexane.

In another embodiment, the granulated copolymer of (meth)acrylic acid and (meth)acrylonitrile further comprises crosslinkers and/or other acrylate-derived repeat units. In other words, the granulated copolymer of (meth)acrylic acid and (meth)acrylonitrile does not only comprise linear chains, but may also comprise crosslinked polymer chains. For example, allyl(meth)acrylate may be used as a crosslinker during the preparation of the copolymer of (meth)acrylic acid and (meth)acrylonitrile. Other suitable acrylate-derived repeat units are for example derived from methyl (meth)acrylate, ethyl(meth)acrylate or t-butyl(meth)acrylate.

In a preferred embodiment, the poly(meth)acrylimide particles are foam-molded to provide a poly(meth)acrylimide molded foam component.

Typically, the foam molding comprises the following steps:
Optionally coating the poly(meth)acrylimide particles with an adhesion promoter;
Filling the optionally coated poly(meth)acrylimide particles in a forming tool;
Heating the forming tool to a forming temperature and pressurizing the forming tool to a forming pressure;
Cooling the forming tool to a cooling temperature to provide a molded foam component;
Deforming the molded foam component.

It is clear to the skilled person that a forming temperature and a forming pressure refers to a temperature, respectively pressure range, which is suitable for foam molding. Furthermore, the term "forming temperature" refers to the temperature of the forming tool.

Preferably, the forming temperature and the forming pressure are maintained for a particular forming time.

The optional step of coating the poly(meth)acrylimide particles with an adhesion promoter can alternatively be performed before the foam molding. For example, the coating may be performed after prefoaming and imidation of the granulated copolymer of (meth)acrylic acid and (meth)acrylonitrile.

In a preferred embodiment, the optionally coated poly(meth)acrylimide particles are preheated to a pre-foaming temperature, which is slightly below their softening temperature or the forming temperature. Typically, the optionally coated poly(meth)acrylimide particles are preheated before being filled in the forming tool, which is preferably also preheated. As a result, the overall process time can be significantly reduced. For example, if the forming temperature is 180° C., the pre-foaming temperature to which the PMI particles are preheated may be 150 to 170° C., preferably 160° C. Therefore, the pre-foaming temperature may typically be 10 to 30° C., preferably 20° C., below the softening temperature or forming temperature.

In a further embodiment, the bulk density of the poly(meth)acrylimide particles is equal to the density of the molded foam component. This has the advantage that the cavity of the forming tool may be completely filled. As a consequence, the foam molded component is evenly foamed over its complete geometry. In typical embodiments, the bulk density may be in the range of 40 to 400 kg/m$^3$, preferably 70 to 150 kg/m$^3$.

In a preferred embodiment, the optionally coated poly(meth)acrylimide particles are filled in an expandable bag prior to filling the particles in the forming tool. The expandable bag may for example be made from nylon, polyamides, polyesters or any other expendable polymer or suitable material, preferably nylon. The bag may further be a fleece, a non-woven, or a foil. Using such a bag has several advantages. Firstly, the bag can be readily and specifically prepared for each molded foam component. For example, the bag can already contain a predetermined amount of optionally coated poly(meth)acrylimide particles, which is specifically required for producing a particular molded foam component. Secondly, the weighing does not have to be performed at the forming tool itself or by the person operating the forming tool. Thus, the overall process is rendered more efficient. Thirdly, the surface quality of the obtained poly(meth)acrylimide materials is significantly increased.

In a further embodiment, the expendable bag is provided with at least partial inherent stability and/or a predefined geometry. Such an embodiment has the advantage, that the optionally coated poly(meth)acrylimide particles can be readily prearranged and distributed within the forming tool as desired. For example, it may be possible to provide specific areas with higher or lower amounts of optionally coated poly(meth)acrylimide particles and/or areas with optionally coated poly(meth)acrylimide particles having a bigger particle size than in other areas. Such a difference in size distribution within the forming tool has been shown to be beneficial for forming edges and angles. It is clear that such a difference in size distribution is possible in all embodiments of the invention, which include a foam molding step. However, using a bag simplifies the arrangement of the particles.

In another embodiment, the forming temperature is in the range of 180 to 260° C., preferably 200 to 240° C. The forming pressure may be in the range of 4 to 10 bar, preferably 5 to 6 bar.

In yet another embodiment, the forming temperature is reached after 5 to 40 min, preferably after 10 to 20 min.

In this and in other embodiments, the forming tool may additionally be preheated to 120 to 250° C. before the optionally coated poly(meth)acrylimide particles are filled into the forming tool.

In preferred embodiments, the forming temperature and/or the forming pressure is maintained for 5 to 40 min. However, it is clear to the skilled person that the required time period depends on the geometry and/or the thickness of the desired PMI material and may be adjusted to a suitable period.

In a preferred embodiment, the foam molding is essentially performed as an isothermal process. Thus, after filling the optionally coated poly(meth)acrylimide particles in the forming tool, the forming temperature is maintained constant. Preferably, the forming temperature is maintained constant at a value in the range of 180 to 260° C., preferably 200 to 240° C., more preferably at 210° C. It is noted that the skilled person understands that the term "essentially" in this context refers to the fact that in some embodiments, a certain heating time is required until the forming temperature is reached and remains constant.

In preferred embodiments, heating the forming tool is performed via rapid heating methods such as induction or via surface-near heating with suitable liquids, for example oil or silicon oil. Such rapid heating methods are advantageous, as the time and cost required for reaching the forming temperature is significantly decreased. Furthermore, this method allows a convenient way of performing the foam molding as an essentially isothermal process.

In still another embodiment, the forming tool is coated with PTFE and/or talcum powder, before the optionally coated poly(meth)acrylimide particles are filled into the forming tool. In particular, it has been observed that the removal of the molded foam component after cooling from the forming tool, i.e. the deforming, proceeds much smoother as compared to an uncoated forming tool. This is especially the case if the forming tool comprises complex edges or grooves. Consequently, it is thereby avoided that the molded foam component adheres to the tool and breaks upon removal. Alternatively, at least parts of the inner surface of the forming tool may be covered with a suitable foil, such as aluminum foil.

In a preferred embodiment, the forming tool is rapidly cooled in the cooling step by contacting the surface with a cooling liquid. Preferably, the temperature gradient between the cooling liquid and the forming tool is high. In certain examples, the temperature of the cooling liquid may be in the range of −20 to 40° C., preferably 5 to 20° C. Thus, the temperature gradient may be in the range of 140 to 280° C. Cooling may for example be achieved by dipping the forming tool in a bath containing the cooling liquid, by positioning the forming tool under a stream of cooling liquid or by rapid introduction of the cooling liquid in a cooling chamber surrounding the forming tool. In certain embodiments the forming tool may be removable and thus configured to be transported to the cooling liquid. The forming tool may also be positioned between cooling plates. The cooling plates may typically be maintained at a temperature of −20 to 40° C., preferably 5 to 40° C., more preferably 10 to 15° C. The cooling liquid can be any suitable liquid, such as water, oil or silicon oil.

It is understood, that such a rapid cooling step is much faster than allowing the forming tool to cool by itself or by cooling with cold air. For example, cooling the forming tool by itself may require between 60 to 120 min, while rapid cooling may only require seconds to a few minutes. It has been surprisingly found that the rapid cooling entails not only a significantly reduced overall process duration, but also results in a molded foam component with a high-quality closed surface, preferably not comprising any pores.

According to a second aspect of the disclosure, the overall objective technical problem is achieved by a process for the production of a poly(meth)acrylimide molded foam component comprising the steps:

Providing prefoamed poly(meth)acrylimide particles;
Optionally coating the poly(meth)acrylimide particles with an adhesion promoter;
Filling the optionally coated poly(meth)acrylimide particles in a forming tool;
Heating the forming tool to a forming temperature and pressurizing the forming tool to a forming pressure;
Cooling the forming tool to a cooling temperature to provide a molded foam component;
Deforming the molded foam component.

The prefoamed poly(meth)acrylimide particles may either be provided by any of the embodiments described above in the first aspect of the disclosure, or by any other method known in the prior art, for example by grinding a copolymer block of poly(meth)acrylimide and subsequent prefoaming of the grinded poly(meth)acrylimide particles.

The embodiments described above for the first aspect of the disclosure, which in particular relate to the foam molding are generally also applicable alone or in all possible combinations in the process according to the second aspect of the disclosure.

EXAMPLES

Example 1

In a first step, a copolymer block of (meth)acrylic acid and (meth)acrylonitrile is grinded to provide the granulated copolymer of (meth)acrylic acid and (meth)acrylonitrile with an average particle size of 1 to 4 mm. The granulated copolymer is then prefoamed and imidated by thermal treatment such that a core temperature of 170 to 250° C. of the granulated copolymer of (meth)acrylic acid and (meth)acrylonitrile and/or the formed poly(meth)acrylate particles is reached, thus providing poly(meth)acrylimide particles.

Example 2

The poly(meth)acrylimide particles of Example 1 are then coated with an adhesion promoter, and filled in the forming tool, which has been coated with PTFE and talcum powder and has been preheated to 130° C. The forming tool is closed, heated to the forming temperature of 250° C. and pressurized to the forming pressure of 5.5 bar. After 30 min, the forming temperature has been reached and the forming tool has been allowed to cool by itself to 80° C.

Example 3a

The poly(meth)acrylimide particles of Example 1 are coated with an adhesion promoter, and filled into the forming tool. The forming tool is closed and readily heated to the forming temperature of 210° C. and pressurized to 6 bar. The forming temperature was maintained for 20 min. The forming tool was then allowed to cool by itself to 80° C. over 90 min.

Example 3b

The poly(meth)acrylimide particles of Example 1 are coated with an adhesion promoter, and filled into the forming tool. The forming tool is closed and readily heated to the forming temperature of 210° C. and pressurized to 6 bar. The forming temperature was maintained for 20 min. Subsequently, the forming tool was removed and rapidly cooled under a stream of cooling water with a temperature of 5 to 20° C.

While the molded foam component obtained from Example 3a showed the occurrence of pores along with a partially structured surface, the molded foam component of Example 3b displayed a smooth and even surface, without any noticeable pores.

The invention claimed is:

1. A process for the production of a poly(meth)acrylimide molded foam component comprising, prefoaming and imidating a granulated copolymer of (meth)acrylic acid and (meth)acrylonitrile by thermal treatment in a single step and thereby providing poly(meth)acrylimide particles, wherein the poly(meth)acrylimide particles are foam-molded to provide a poly(meth)acrylimide molded foam component, wherein foam-molding comprises the steps:
Filling the poly(meth)acrylimide particles in a forming tool;
Heating the forming tool to a forming temperature of 200° C. to 240° C. and pressurizing the forming tool to a forming pressure;
Maintaining the forming temperature for 40 min;
Cooling the forming tool to a cooling temperature and deforming the molded foam component to provide a poly(meth)acrylimide molded foam component.

2. The process according to claim 1, further comprising: before prefoaming and imidating the granulated copolymer of (meth)acrylic acid and (meth)acrylonitrile grinding a copolymer block of (meth)acrylic acid and (meth)acrylonitrile to provide the granulated copolymer of (meth)acrylic acid and (meth)acrylonitrile.

3. The process according to claim 2, wherein the grinding provides a granulate with a particle size of 0.2 to 4 mm.

4. The process according to claim 1, wherein during the thermal treatment the granulated copolymer reaches a temperature of 170° C. to 250° C.

5. The process according to claim 1 wherein the granulated copolymer of (meth)acrylic acid and (meth)acrylonitrile is provided as a single layer during the thermal treatment.

6. The process according to claim 1, wherein the thermal treatment is performed by an infrared source, emitting infrared radiation with wavelengths in the range of 1 to 10 μm or by a drying oven.

7. The process according to claim 1, wherein the poly(meth)acrylimide particles are preheated to a pre-foaming temperature that is below their softening temperature or the forming temperature.

8. The process according to claim 1, wherein a bulk density of the poly(meth)acrylimide particles is equal to a density of the poly(meth)acrylimide molded foam component.

9. The process according to claim 1, wherein the coated poly(meth)acrylimide particles are filled in an expandable bag prior to filling the poly(meth)acrylimide particles in the forming tool.

10. The process according to claim 9, wherein the expandable bag is provided with at least one of a partial inherent stability and a predefined geometry.

11. The process according to claim 1, wherein the forming pressure is in the range of 4 to 10 bar.

12. The process according to claim 1, wherein heating the forming tool to the forming temperature of 200° C. to 240° C. occurs over a period of time ranging from 5 to 40 min.

13. The process according to claim 1, wherein the foam molding is performed as an isothermal process.

14. The process according to claim 1, wherein the forming tool is coated with at least one of PTFE and a talcum powder before filling the coated poly(meth)acrylimide particles in the forming tool.

15. The process according to claim 1, wherein while cooling the forming tool to the cooling temperature, the forming tool is cooled by contacting a surface of the forming tool with a cooling liquid or by positioning the forming tool between cooling plates.

16. The process according to claim 1, wherein the poly(meth)acrylimide particles are coated with an adhesion promoter before foam-molding.

* * * * *